L. A. TIRRILL.
BELT TIGHTENER.
APPLICATION FILED JAN. 30, 1905.
1,074,562.
Patented Sept. 30, 1913.
2 SHEETS—SHEET 2.
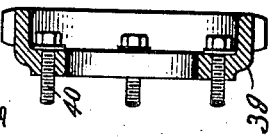
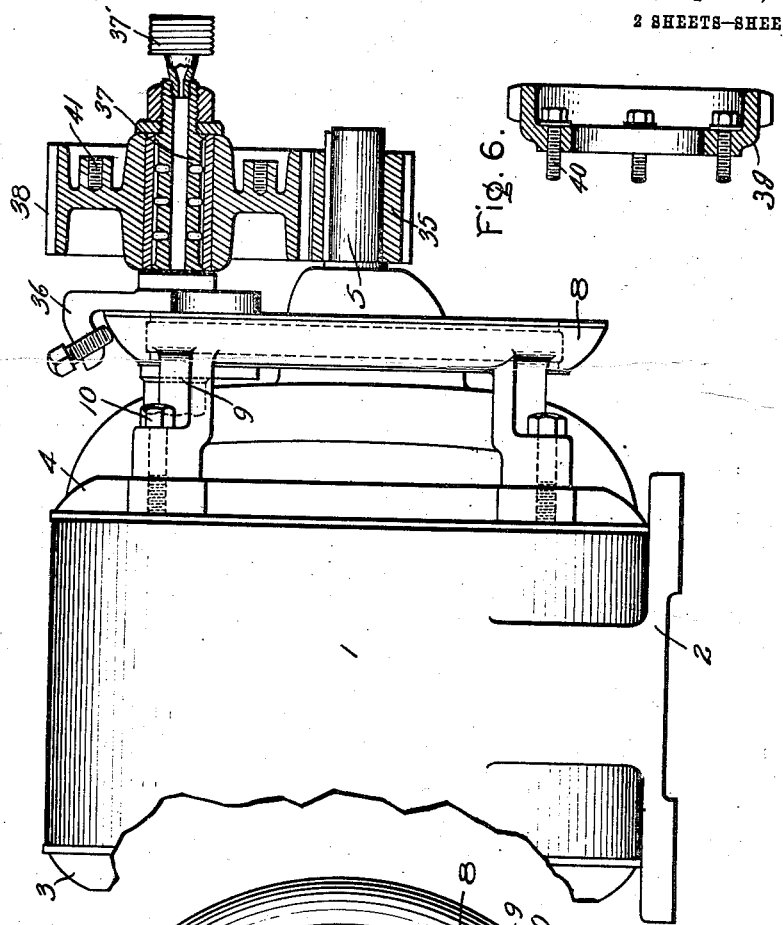
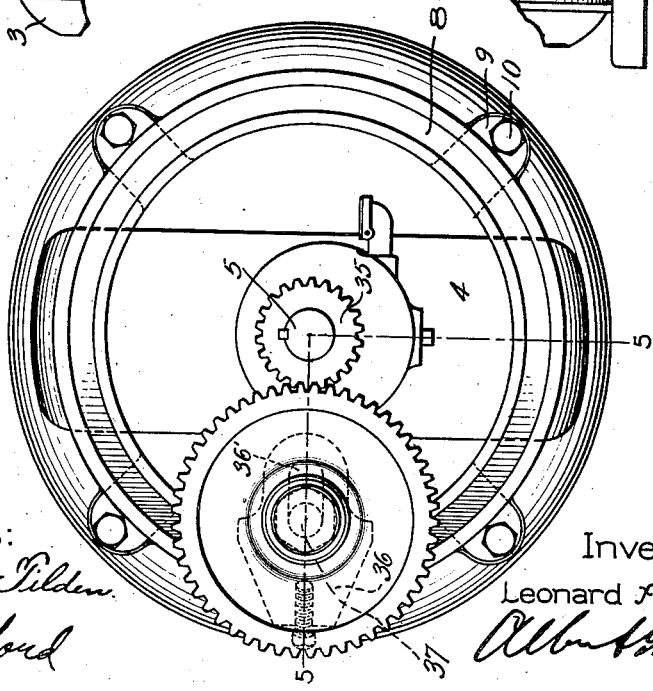
Witnesses:
George H. Tilden
Helen Alford
Inventor:
Leonard A. Tirrill,
Albert R. Davis
Att'y.

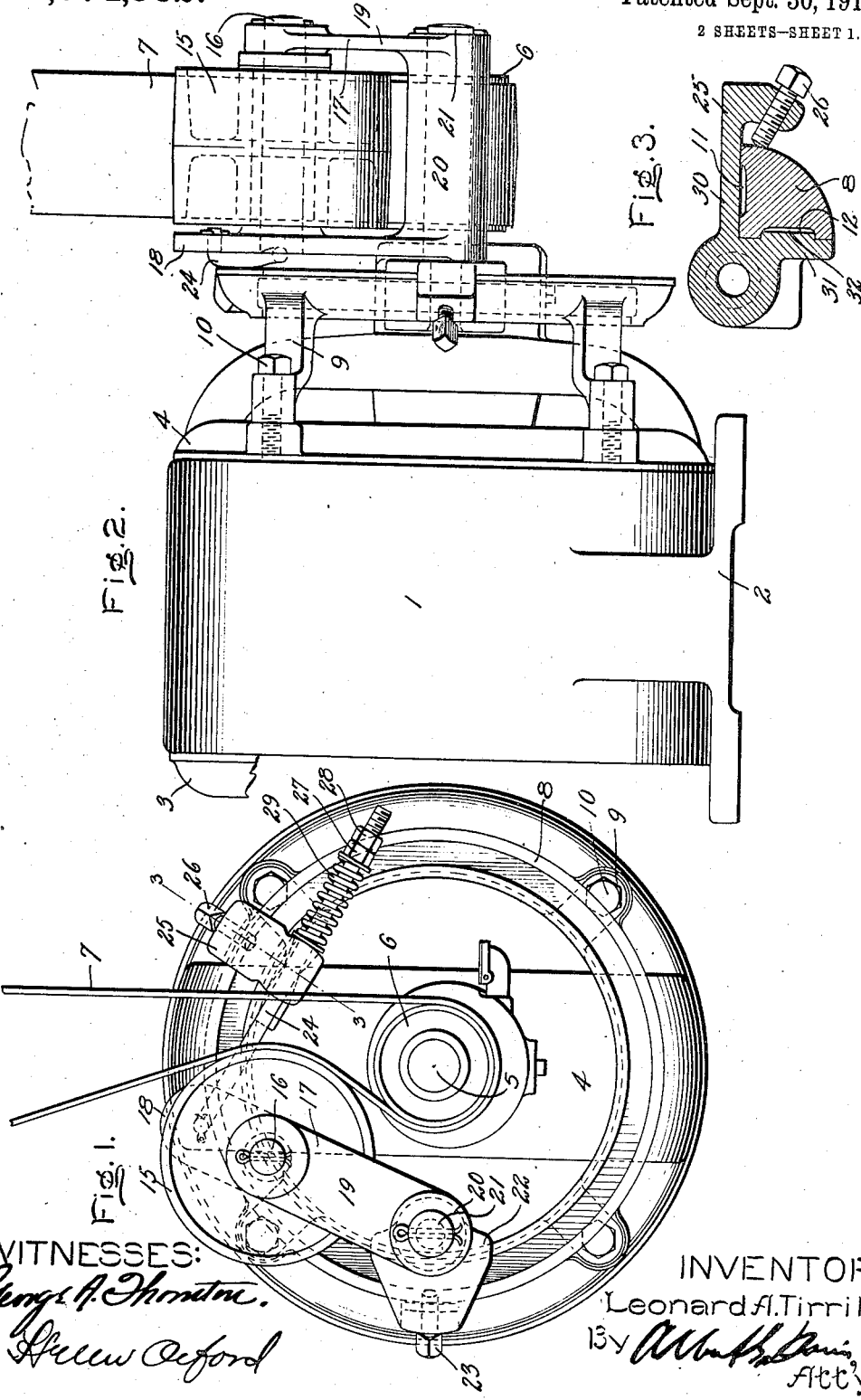

UNITED STATES PATENT OFFICE.

LEONARD A. TIRRILL, OF LYNN, MASSACHUSETTS, ASSIGNOR TO GENERAL ELECTRIC COMPANY, A CORPORATION OF NEW YORK.

BELT-TIGHTENER.

1,074,562.   Specification of Letters Patent.   Patented Sept. 30, 1913.

Application filed January 30, 1905. Serial No. 243,198.

*To all whom it may concern:*

Be it known that I, LEONARD A. TIRRILL, a citizen of the United States, residing at Lynn, county of Essex, State of Massachusetts, have invented certain new and useful Improvements in Belt-Tighteners, of which the following is a specification.

My present invention has for its object the production of a simple and efficient construction for supporting a belt tightener or the like which can be readily applied to dynamo-electric machines of ordinary construction.

My invention comprises novel features of construction and arrangement, all of which are pointed out with particularity in the claims annexed to and forming a part of this specification.

For a better understanding of my invention, however, reference may be had to the accompanying drawings and description in which I have illustrated and described a structure in which my invention may be embodied.

Of the drawings, Figure 1 shows an end elevation of a dynamo-electric machine equipped with a belt tightener supported in accordance with my invention; Fig. 2 is a side elevation of the machine shown in Fig. 1; Fig. 3 is a section on the line 3 3 of Fig. 1; Fig. 4 is an end elevation of a modified construction in which an armature shaft and counter shaft are connected by two gears; Fig. 5 is a view taken similar to Fig. 2, with parts in section, on line 5 5 of Fig. 4; and Fig. 6 is a sectional view showing a gear which may be used with the construction shown in Figs. 4 and 5.

In the drawings, 1 represents the field ring or frame of a dynamo-electric machine. The field ring 1 is provided with the usual supporting feet 2. End members or heads 3 and 4 are secured against the ends of the field ring 1. The armature shaft 5 is journaled in bearings carried by the end members 3 and 4 in the usual manner. In the construction shown in Figs. 1 and 2 one end of the armature shaft has secured to it a power-transmitting pulley 6 which drives or is driven by a flexible belt 7.

An annular member or ring or yoke or plate 8 concentric with the armature shaft is located adjacent the pulley and at the end of the armature shaft 5. The ring 8 is preferably provided with apertured lugs or feet 9. Equally spaced bolts 10, which form angularly spaced points of attachment, pass through the apertures of the lugs or feet 9 in order to secure the ring 8 to the field ring 1. In the construction illustrated the bolts 10 also pass through the annular flange of the end member 4 and are thus employed to secure both the end member 4 and the annular member 8 in position.

The inner periphery of the member 8 is cylindrical and machined. The outer end surface of the ring is perpendicular to the armature shaft and is also machined. In order to reduce the machine work necessary, the outer end surface and inner periphery of the member are channeled at 11 and 12 respectively as is clearly shown in Fig. 3. The channel 12 has a function to perform which will be hereinafter pointed out. The two machined surfaces of the member are connected by a convexly-curved surface so that the member is substantially triangular in cross-section, as clearly appears in Fig. 3.

The belt tightener pulley or idler pulley 15 is mounted on a shaft 16 carried in a frame 17. The frame 17 comprises two arms 18 and 19 which extend from a hub 20. The hub 20 is pivotally mounted on a stud-shaft 21 carried by a member 22 which is adjustably clamped to the annular member 8 by a set-screw 23.

The inner arm 18 of the frame 17 is extended beyond the shaft 16. A rod 24 is pivotally connected to the extended end of the arm 18. This rod passes through an opening formed for the purpose in a member or anchor pin 25, which is adjustably secured to the member 8 by a screw 26. The free end of the rod 24 is threaded and carries a nut 27 which may be adjusted along the threaded portion of the rod and may be secured in any desired position by a lock-nut 28. A helical spring 29 surrounding the rod has one end bearing against the nut 27 and the other end against the member 25.

The member 25 is provided with a portion 30 which abuts against the outer end surface of the member 8 and another portion 31 at right angles to the portion 30 which abuts against the inner periphery of the member 8. A projection 32 from the portion 31 of the member 25 fits in the channel 12 formed in the end member 8 and assists in positioning the device 25. It will be understood that the outer surface of the portion 31 is curved to fit the inner periphery of the member 8. An inturned extension from the portion 30 of the member 25 is formed with a threaded opening in which the clamping screw or bolt 26 is located. The inner end of the screw or bolt 26 engages the convexly-curved surface of the member 8.

The portions of the clamping member 22 which engage the ring member 8 are substantially identical in construction with corresponding portions of the clamping member 25. To adjust the belt tightener angularly about the armature shaft, it is only necessary to loosen the screws 23 and 26 and move the belt tightener into the desired position whereupon the screws 23 and 26 are again screwed home. In this way, the ring member or yoke 8 provides a plurality of connection points for the arms 18 and 19 which may be of different angular spacing from the spacing of the points of attachment of the yoke to the frame, and in the construction shown in the drawing are infinite in number. The rod 24 and spring 29 hold the pulley 15 against the belt 7 with any desired pressure, regardless of the slight changes in the length of the belt, which may occur from time to time on account of changes in the temperature or moisture of atmosphere or the like. It will be observed that the belt tightener construction shown and described can be applied to dynamo-electric machines of the ordinary construction without any further change than an increase in the length of the bolts 10.

In the construction shown in Figs. 4 and 5, the power-transmitting device carried by the armature shaft 5 of the motor is a spur gear 35 instead of a pulley, as shown in Figs. 1 and 2. A member 36 which may be substantially identical in construction with the member 22, but is usually somewhat heavier and stronger, carries a counter shaft 37. A gear wheel 38, usually considerably larger than the gear wheel 35, is mounted on the counter shaft 37, which meshes with the gear wheel 35. A suitable device 37' is employed to lubricate the shaft 37. By reason of the difference in diameter of the gear wheels 35 and 38, the counter shaft rotates considerably slower than the armature shaft, and the arrangement forms a speed-reducing device. The counter shaft 37 is secured in a slot 36' in the member 36, and may be moved toward and away from the shaft 5 to permit the use of gears of different diameters.

In the construction shown in Figs. 4 and 5, the gear wheel 38 is intended to mesh with another gear wheel (not shown) and serves to transmit power from the machine to the gear wheel (not shown) or vice versa depending on whether the machine is employed as a motor or a generator. In some cases the gear wheel 38 may be provided with means for driving a flexible power-transmitting member. For instance, the sprocket wheel 39 shown in Fig. 6 may be secured to the gear wheel 38 by the bolts 40 screwed into the threaded recesses 41. The sprocket wheel 39 drives a sprocket chain (not shown).

It will be observed that the member 36 is angularly adjustable about the armature shaft in the same manner as in the member 22, and by this construction the gear wheel 38 may be adjusted about the armature shaft whenever desirable.

What I claim as new and desire to secure by Letters Patent of the United States, is—

1. In combination, an end plate of a dynamo-electric machine, a ring-shaped member having lugs or feet with apertures therein, bolts passing through said apertures for securing said ring-shaped member in place, and a belt tightener comprising an idler pulley, a pivoted support for said pulley, an abutment on which said support is mounted, and means for locking said abutment at any one of a plurality of points on said ring-shaped member to change the position of the idler pulley.

2. The combination of a pulley, a supporting shaft, a frame surrounding the shaft with angularly spaced points of attachment, an idler pulley, an arm for the support of the idler pulley, a yoke with a plurality of connection points for the arm, and a tension device applied to the arm, substantially as described.

3. The combination of a pulley, a supporting shaft, a frame surrounding the shaft with angularly spaced points of attachment, an idler pulley, an arm for the support of the idler pulley, and a yoke with a plurality of connection points for the arm with different angular spacing from the spacing of the points of attachment of the yoke to the frame, substantially as described.

4. The combination of a pulley, a supporting shaft, a frame surrounding the shaft with angularly spaced points of attachment, an idler pulley, an arm for the support of the idler pulley, a yoke with a plurality of connection points for the arm, a tension spring for the idler arm and an anchor pin adapted to be attached at the connection points provided for the arm, substantially as described.

5. In combination, an electric motor having a frame and an end-head, a plurality of equally spaced bolts for attaching said end-head to said frame, a belt-tightener comprising an idler-pulley, a pivoted support for said pulley, and a plate on which said support is mounted, said plate being mounted on a bolt passing through the end-head into the frame, substantially as described.

6. In combination, an electric motor having a frame and an end-head, a plurality of substantially equally spaced bolts for attaching said end head to said frame, a belt-tightener comprising an idler-pulley, a pivoted support for said pulley, a ring shaped member mounted on said bolts passing through the end head into said frame, a tension device for said support, and means for locking said pivoted support and said tension device at any one of a plurality of points on said ring shaped member to change the position of the idler pulley.

7. In combination, an electric motor having a frame and an end-head, a plurality of substantially equally spaced bolts for attaching said end head to said frame, a belt tightener comprising an idler-pulley, a pivoted support for said pulley, a ring-shaped member having lugs or feet with apertures therein, said bolts passing through said apertures for securing said ring-shaped member in place, a tension device for said support, and means for locking said pivoted support and said tension device at any one of a plurality of points on said ring shaped member to change the position of the idler pulley.

In witness whereof, I have hereunto set my hand this twenty-sixth day of January, 1905.

LEONARD A. TIRRILL.

Witnesses:
JOHN A. McMANUS, Jr.,
DUGALD McK. McKILLOP.